No. 787,579. PATENTED APR. 18, 1905.
F. LAMBERT.
WATER METER.
APPLICATION FILED JULY 3, 1902.

Attest:
Geo H Botts
Mabelle F. Lake

Inventor:
Frank Lambert
By Edith J. Griswold
Atty.

No. 787,579.

Patented April 18, 1905.

UNITED STATES PATENT OFFICE.

FRANK LAMBERT, OF BROOKLYN, NEW YORK.

WATER-METER.

SPECIFICATION forming part of Letters Patent No. 787,579, dated April 18, 1905.

Application filed July 3, 1902. Serial No. 114,197.

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and has for its object to improve the construction, to avoid certain defects in meters having a measuring-chamber adapted to be moved out of normal position in a pressure-casing, and to prevent bursting or distortion from excessive internal pressure. One defect in certain meters of this kind that my improvements overcome is that of leakage at the time of excessive pressure or after such pressure has been relieved, and in meters provided with resilient means, such as springs, for automatically returning the parts to normal position after the excessive pressure has moved them out of position a serious defect exists in having the said springs exposed to the action of the atmosphere, since these meters are generally placed in cellars or other places where considerable dampness or moisture exists.

By my present invention I make the pressure-casing with two compartments, one of which is normally free to the water in the meter, while the other virtually forms an air-chamber closed to the atmosphere and normally closed from the water-compartment, and preferably the air-compartment is so placed that a resilient or spring device for holding the internal parts of the meter in normal position may be placed in said air-compartment for protection from dampness.

In the accompanying drawings I have shown various diagrams to illustrate my invention; but I do not limit myself to any specific construction.

It may be here noted that certain features of the various forms here shown constitute the subject-matter of other applications for patents filed by me.

Figures 1, 2, 3, and 4 represent central sectional elevations of meters to which my improvements have been applied in four different ways. In all these constructions it will be noted that the pressure-casing has been divided into the two compartments mentioned by means of the measuring-chamber; but I do not limit myself to this feature.

Figure 1:
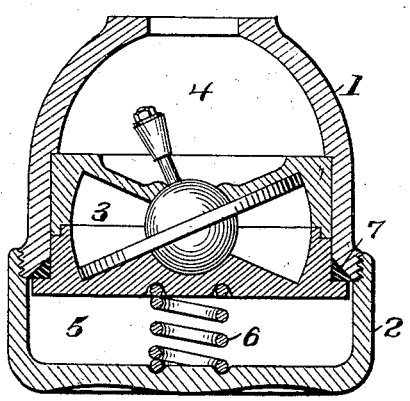

Referring to Fig. 1, the pressure-casing consists of the upper shell 1, threaded at its outer periphery at the lower end, and a bottom shell 2, screwing upon said threaded portion of the upper shell 1. The measuring-chamber 3 when in said casing divides it so as to form a compartment 4 in the upper part of the casing and a compartment 5 in the lower part. As is well known, water passing through these meters flows freely in the upper part or compartment 4. As shown in Fig. 1, a spring 6, compressed between the bottom shell 2 and the measuring-chamber 3, will maintain the said chamber in normal position under normal water-service pressure, and packing 7 being compressed between the casing and chamber by the force exerted by the spring 6 will make a water-tight joint, isolating the air-chamber 5 from the upper part of the meter to which the water has access. It will be seen that with this construction under normal conditions the air-compartment 5 is closed from the dampness of the atmosphere and from the water in the meter, so that the spring 6 is protected from injurious effects of moisture; also, that if there is excessive pressure in the meter—as, for instance, in case of freezing or water-hammer—the measuring-chamber 3 may be forced downward against the action of the spring 6, and thus increase the space in the water-compartment 4 without opening the pressure-casing and causing leakage. In case water should have leaked into the air-compartment during abnormal conditions or before the spring 6 returns the parts to normal position the lower shell 2 can readily be removed at a convenient time to empty the water and dry the compartment. As such leakage from the upper to the lower part of the pressure-casing is infrequent, damage to the spring device would be of little consequence from this cause.

Figure 2:
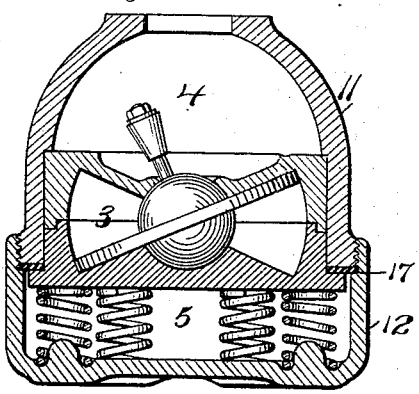

Fig. 2 represents the upper shell 11 and lower shell 12 screwed together, as in Fig. 1; but here the shell 12 is provided with a shoulder in a position to compress part of the packing 17 between it and the upper shell 11 to form positively a water-tight joint between the two shells.

Figure 3:
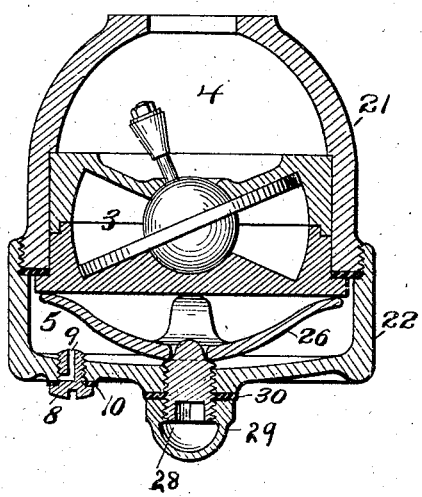

In Fig. 3 I have shown in the bottom of the lower shell 22 of the pressure-casing a plug 8, provided with a vent-hole 9, adapted to open the compartment 5 to the atmosphere for the purpose of testing the meter for leakage. It will be seen that by unscrewing the plug 8 slightly any water in the compartment 5 would flow out through the hole 9 and disclose leakage of the meter. A packing 10 makes a water-tight joint between the plug and the shell when the plug is screwed up.

With a construction such as here shown it may be found desirable to provide means for adjusting the tension of the spring device up to a predetermined point. Fig. 3 shows a leaf-spring 26 for holding the chamber in normal position, the tension of which may be adjusted by means of a screw-plug 28, threaded through the shell 22, its inner end engaging with the spring 26 to compress it or allow it to expand, according to the distance the plug 28 is screwed in or out. Thus after the parts have been assembled the vent-plug 8 may be opened, the meter put under test with a predetermined pressure, and the adjusting screw-plug 28 adjusted until the spring 26 is under sufficient tension to balance the test-pressure, as may be determined by the plug 8 showing whether there is leakage or not.

When the spring device is once adjusted to the predetermined tension at the factory, it is advisable to provide means for keeping this adjustment fixed, since the meter is generally taken apart by inspectors or others after the meter leaves the factory. These means may consist of check-nut 29 or any other convenient device for holding the plug 28 in its adjusted position. Packing 30, compressed between the shell 22 and check-nuts 29, can be used to make a water-tight joint between the plug and the shell.

When the meter is taken apart for inspection or repair, the shell 22 is unscrewed from the shell 21 and the plug 28 left alone in its adjusted position, so that when the shell 22 is again screwed up tight upon shell 21 the adjusting-plug 28 will force the spring 26 to the same tension given it in the factory.

Figure 4:
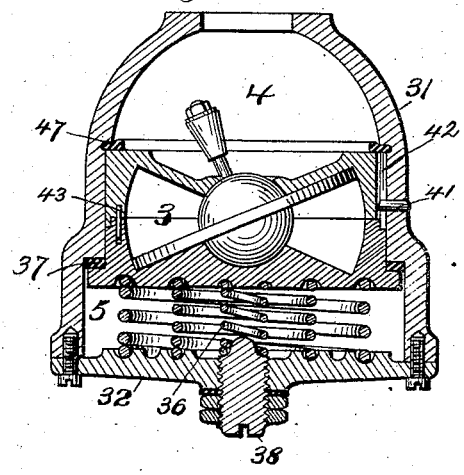

Fig. 4 represents the pressure-casing formed of an upper shell 31, having a bottom plate 32 screwed thereto to close the lower end of shell 31. The measuring-chamber 3 is here shown as being axially registered in the casing and prevented from rotation therein by a pin 41 in the wall of the casing entering a vertical slot 42 in the upper section of the chamber, and a pin 43, engaging in registering holes in the two sections, prevents independent rotation of said sections. The arrangement of packing or gaskets 37 47 with the flanged chamber forms part of and is claimed in a separate application for patent, Serial No. 105,059. In this construction a plurality of coiled springs are shown adapted to hold the chamber 3 in position against the internal water-service pressure, one of said springs 36 adapted to have its tension adjusted by an adjusting-plug 38.

From the foregoing it will be seen that I provide an auxiliary chamber or compartment 5 within the pressure-casing that will catch any leakage, that will virtually add its cubic space to the water-compartment when excessive pressure forces open the joint isolating this air-compartment and opens communication between the two compartments, so that said water-compartment has a chance to expand to prevent damage to the meter, and also that will normally protect from moisture or dampness within or without a spring device liable to injury from dampness.

I claim as my invention—

1. In a water-meter, a pressure-casing, a device for dividing the same into two compartments, one of which is free to the water passing through the meter, the other compartment being isolated from the water by said device, and yielding means for holding said device whereby the latter is capable of being forced by excessive internal pressure to open communication between said compartments without damage to the parts.

2. In a water-meter, a pressure-casing, and a measuring-chamber dividing the said casing into two compartments one of which is normally free to the water in the meter, yielding means for holding said chamber in normal position, the said chamber capable of being forced out of normal position under undue pressure to increase the space in the water-compartment under excessive internal pressure, while the casing remains water-tight.

3. In a water-meter, a pressure-casing, a measuring-chamber dividing the said casing into two compartments one serving as a water-compartment and the other as an air-compartment, with a spring device in said air-compartment adapted to hold the said chamber in normal position.

4. In a water-meter, a pressure-casing, a measuring-chamber dividing the said casing into two compartments one serving as a water-compartment and the other as an air-compartment, with a spring device in said air-compartment adapted to hold the said chamber in normal position, and means for adjusting the tension of said spring device in said compartment.

In testimony whereof I have signed my name to this specification in the presence of two subscribing witnesses.

FRANK LAMBERT.

Witnesses:
  MABELLE F. LAKE,
  EDITH J. GRISWOLD.